(12) United States Patent
Heo et al.

(10) Patent No.: US 10,595,017 B2
(45) Date of Patent: Mar. 17, 2020

(54) MODELING-BASED IMAGE DECODING METHOD AND DEVICE IN IMAGE CODING SYSTEM

(71) Applicant: LG ELECTRONICS INC., Seoul (KR)

(72) Inventors: Jin Heo, Seoul (KR); Eunyong Son, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/768,773

(22) PCT Filed: Oct. 24, 2016

(86) PCT No.: PCT/KR2016/011948
§ 371 (c)(1),
(2) Date: Apr. 16, 2018

(87) PCT Pub. No.: WO2017/069590
PCT Pub. Date: Apr. 27, 2017

(65) Prior Publication Data
US 2018/0309983 A1 Oct. 25, 2018

Related U.S. Application Data

(60) Provisional application No. 62/245,251, filed on Oct. 22, 2015.

(51) Int. Cl.
*H04N 19/176* (2014.01)
*H04N 19/105* (2014.01)
(Continued)

(52) U.S. Cl.
CPC .......... *H04N 19/105* (2014.11); *H04N 19/11* (2014.11); *H04N 19/117* (2014.11); *H04N 19/13* (2014.11);
(Continued)

(58) Field of Classification Search
None
See application file for complete search history.

(56) References Cited

U.S. PATENT DOCUMENTS 9,769,449 B2 * 9/2017 He .................... H04N 11/02
2008/0240592 A1 10/2008 Lee et al.
(Continued)

FOREIGN PATENT DOCUMENTS

KR 10-2012-0034043 A 4/2012
KR 10-2013-0045807 A 5/2013
(Continued)

OTHER PUBLICATIONS

Run Cha et al, "Improved Combined Inter-Intra Prediction Using Spatial-Variant Weighted Coefficient," Multimedia and Expo, 2011, IEEE, Jul. 11, 2011, pp. 1-5.
(Continued)

*Primary Examiner* — Jayanti K Patel
*Assistant Examiner* — Shadan E Haghani
(74) *Attorney, Agent, or Firm* — Dentons US LLP

(57) ABSTRACT

According to the present invention, an image decoding method performed by a decoding device comprises the steps of: deriving a prediction mode of a current block; generating a prediction block of the current block on the basis of the prediction mode of the current block; deriving a neighboring block of the current block; deriving correlation information on the basis of a reconstruction block of the neighboring block and a prediction block of the neighboring block; deriving a modified prediction block of the current block on the basis of the prediction block of the current block and the correlation information; and deriving a reconstruction block of the current block on the basis of the modified prediction block. According to the present invention, a current block can be predicted in consideration of the correlation between (Continued)

a prediction sample and a reconstruction sample of a neighboring block, and a complicated image can be more efficiently reconstructed through the prediction.

9 Claims, 9 Drawing Sheets

(51) Int. Cl.
*H04N 19/147* (2014.01)
*H04N 19/11* (2014.01)
*H04N 19/117* (2014.01)
*H04N 19/44* (2014.01)
*H04N 19/13* (2014.01)
*H04N 19/139* (2014.01)
*H04N 19/91* (2014.01)

(52) U.S. Cl.
CPC ......... *H04N 19/139* (2014.11); *H04N 19/147* (2014.11); *H04N 19/176* (2014.11); *H04N 19/44* (2014.11); *H04N 19/91* (2014.11)

(56) References Cited

U.S. PATENT DOCUMENTS

| | | | |
|---|---|---|---|
| 2011/0026599 A1 | 2/2011 | Andersson et al. | |
| 2012/0201311 A1 | 8/2012 | Sole et al. | |
| 2013/0177078 A1 | 7/2013 | Lee et al. | |
| 2014/0192886 A1* | 7/2014 | Fran Ois | H04N 19/503 375/240.16 |
| 2014/0376626 A1 | 12/2014 | Lee | |
| 2018/0295365 A1* | 10/2018 | Seregin | H04N 19/46 |
| 2019/0149835 A1* | 5/2019 | Lee | H04N 19/463 |

FOREIGN PATENT DOCUMENTS

| | | |
|---|---|---|
| KR | 10-2013-0063044 A | 6/2013 |
| KR | 10-2013-0085979 A | 7/2013 |
| KR | 10-1369224 B1 | 3/2014 |

OTHER PUBLICATIONS

Carlo Noel Ochotorena et al, "Regression-based Intra-prediction for Image and Video Coding," Cornell University, May 12, 2016, pp. 1-5.

* cited by examiner

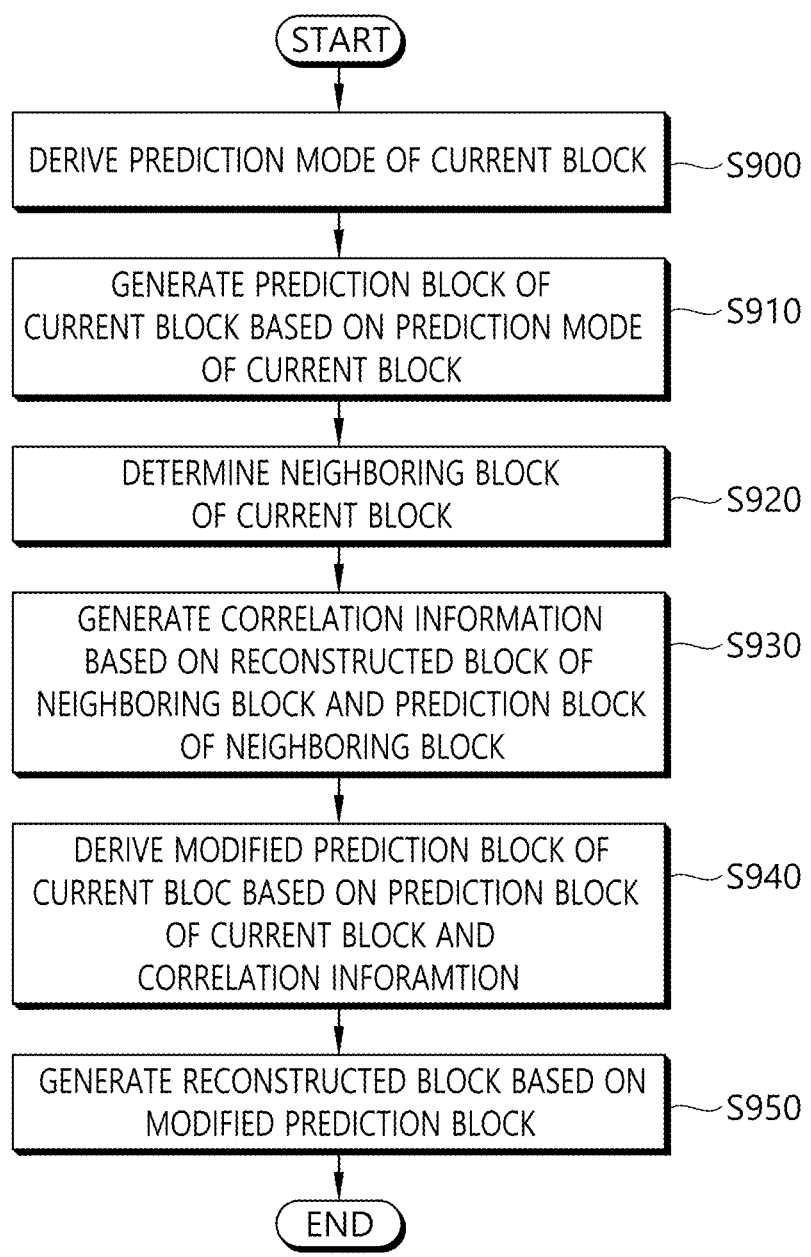

MODELING-BASED IMAGE DECODING METHOD AND DEVICE IN IMAGE CODING SYSTEM

CROSS-REFERENCE TO RELATED APPLICATIONS

This application is the National Stage filing under 35 U.S.C. 371 of International Application No. PCT/KR2016/011948, filed on Oct. 24, 2016, which claims the benefit of U.S. Provisional Application No. 62/245,251 filed on Oct. 22, 2015, the contents of which are all hereby incorporated by reference herein in their entirety.

BACKGROUND OF THE INVENTION

Field of the Invention

The present invention relates to an image coding technique and, more particularly, to a modeling-based image decoding method and device in an image coding system.

Related Art

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

The present invention provides a method and device for improving image coding efficiency.

The present invention provides a method and device for improving efficiency of a prediction mode to reduce an amount of data of residual information of the current block.

The present invention provides a method and device for efficiently decoding an image based on a prediction mode that uses information about a neighboring block of the current block.

The present invention provides a method and device for efficiently decoding an image based on a prediction mode that utilizes a correlation between a prediction sample and a reconstructed sample of a neighboring block of the current block.

In one aspect of the present invention, there is provided a video decoding method performed by a video decoder. The method includes: deriving a prediction mode of a current block; generating a prediction block of the current block based on the prediction mode of the current block; deriving a neighboring block of the current block; deriving correlation information based on a reconstructed block of the neighboring block and a prediction block of the neighboring block; deriving a modified prediction block of the current block based on the prediction block of the current block and the correlation information; and deriving a reconstructed block of the current block based on the modified prediction block.

In another aspect of the present invention, there is provided a decoder for performing video decoding. The decoder includes an entropy decoder configured to derive a prediction mode of a current block; and a predictor configured to generate a prediction block of the current block based on the prediction mode of the current block, derive a neighboring block of the current block, derive correlation information based on a reconstructed block of the neighboring block and a prediction block of the neighboring block, derive a modified prediction block of the current block based on the prediction block of the current block and the correlation information, and derive a reconstructed block of the current block based on the modified prediction block.

In yet another aspect of the present invention, there is provided video encoding method performed by a video encoder. The method includes: deriving a prediction mode of the current block; generating a prediction block of the current block based on the prediction mode of the current block; determining a neighboring block of the current block; generating correlation information based on a reconstructed block of the neighboring block and a prediction block of the neighboring block; deriving a modified prediction block of the current block based on the prediction block of the current block and the correlation information; generating residual information based on an original block of the current block and the modified prediction block; and encoding information on the prediction mode of the current block and the residual information, and outputting the encoded information.

In yet another aspect of the present invention, there is provided an encoder for performing video encoding. The encoder includes: a predictor configured to derive a prediction mode of the current block, generating a prediction block of the current block based on the prediction mode of the current block, determine a neighboring block of the current block, generate correlation information based on a reconstructed block of the neighboring block and a prediction block of the neighboring block, derive a modified prediction block of the current block based on the prediction block of the current block and the correlation information, and generate residual information based on an original block of the current block and the modified prediction block; and an entropy encoder configured to encode information on the prediction mode of the current block and the residual information and output the encoded information.

According to the present invention, information about prediction of a neighboring block of the current block may be used to predict the current block and, as a result, a complicated video may be reconstructed more efficiently.

According to the present invention, the current block may be predicted in consideration of correlation between a prediction sample and a reconstructed sample of a neighboring block and, as a result, a complicated video may be reconstructed more efficiently.

According to the present invention, prediction performance may be enhanced by predicting the current block in consideration of a prediction sample and a reconstructed sample of a neighboring block and, as a result, an amount of data of residual information is reduced, thereby improving overall coding efficiency.

BRIEF DESCRIPTION OF THE DRAWINGS

FIG. 9 schematically shows a video decoding method by a decoder according to the present invention.

DESCRIPTION OF EXEMPLARY EMBODIMENTS

Figure 1:
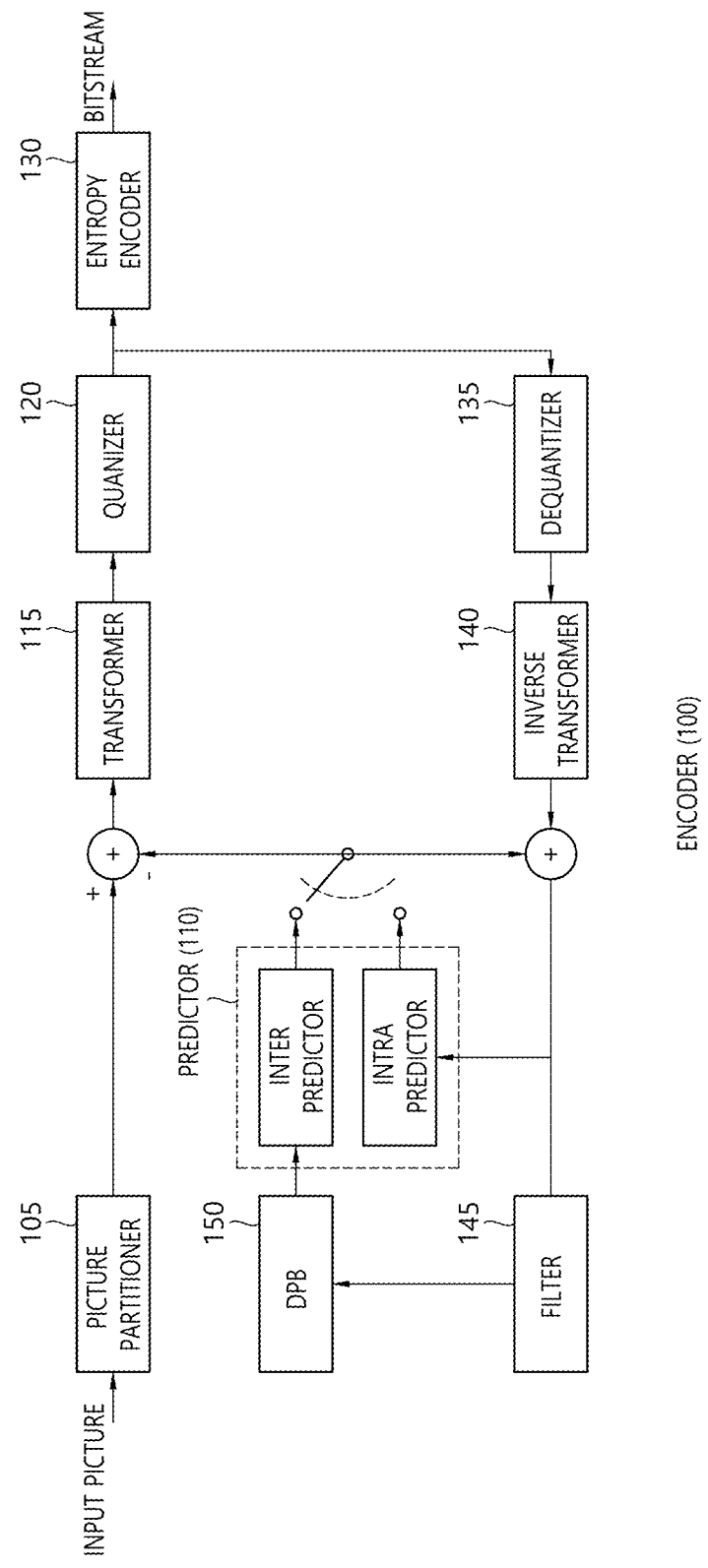
FIG. 1 is a block diagram schematically illustrating a video encoder according to an embodiment of the invention.

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoder according to an embodiment of the invention.

Referring to FIG. 1, a video encoder 100 includes a picture partitioner 105, a predictor 110, a transformer 115, a quantizer 120, an entropy encoder 130, a dequantizer 135, an inverse transformer 140, a filter 145, and a memory 150. The picture partitioner 105 may include or be referred to as an image partitioner. The memory 150 may include or be referred to as a Decoded Picture Buffer (DPB). In FIG. 1, an inter predictor and an intra predictor are configures separately, but it is merely an example, and the encoder 100 may include a predictor 110 including the inter predictor and the intra predictor. In addition, although not illustrated in the drawing, the encoder 100 may further include a re-arranger.

The picture partitioner 105 may be configured to split the input picture into at least one processing unit block. In this connection, a block as a processing unit may be a prediction unit PU, a transform unit TU, or a coding unit CU. The picture may be composed of a plurality of coding tree unit CTUs. Each CTU may be split into CUs as a quad tree structure. The CU may be split into CUs having a lower depth as a quad-tree structures. The PU and TU may be obtained from the CU. For example, the PU may be partitioned from a CU into a symmetric or asymmetric square structure. Further, the TU may be split into a quad tree structure from the CU.

The predictor 110 includes an inter predictor that performs an inter prediction process and an intra predictor that performs an intra prediction process, as will be described later. The predictor 110 performs a prediction process on the processing units of a picture divided by the picture partitioner 105 to create a prediction block including a prediction sample or a prediction sample array. In the predictor 110, the processing unit of a picture may be a CU, a TU, or a PU. The predictor 110 may determine whether the prediction performed on the corresponding processing unit is an inter prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

The inter prediction may use a skip mode, a merge mode, or Advanced Motion Vector Prediction (AMVP). In the inter prediction, a reference picture may be selected for the PU, and a reference block corresponding to the PU may be selected. The reference block may be an integer pixel or sample unit, or a fractional pixel or sample unit. The prediction block is then generated for which the residual signal relative to the current PU is minimized and the motion vector size is minimized.

A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter prediction, the motion vector difference MDV, the motion vector predictor MVP, residual signal, etc., may be entropy encoded and then transmitted to the decoder. When the skip mode is applied, the prediction block may be used as a reconstructed block, so that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be constructed after a filter is applied to a reference sample. At this time, it may be determined whether a filter should be applied to a reference sample depending on the intra prediction mode and/or the size of a current block.

Residual values (a residual block or a residual signal) between the constructed prediction block and the original block are input to the transformer 115. The prediction mode information, the motion vector information, and the like used for the prediction are encoded along with the residual values by the entropy encoder 130 and are transmitted to the decoder.

The transformer 115 performs a transform process on the residual block in the unit of TUs and creates transform coefficients.

A transform block is a rectangular block of samples and is a block to which the same transform is applied. The transform block may be a TU and may have a quad-tree structure.

The transformer 115 may perform a transform process depending on the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transformer 115 may construct a transform block of transform coefficients through the transform.

The quantizer 120 may quantize the residual values, that is, transform coefficients, transformed by the transformer 115 and may create quantization coefficients. The values calculated by the quantizer 120 may be supplied to the dequantizer 135 and a re-arranger.

The re-arranger may rearrange the transform coefficients supplied from the quantizer 120. By rearranging the quantization coefficients, it is possible to enhance the encoding efficiency in the entropy encoder 130.

The re-arranger may rearrange the quantized transform coefficients in the form of a two-dimensional block to the form of a one-dimensional vector through the use of a coefficient scanning method.

The entropy encoder 130 may be configured to entropy code the symbol according to a probability distribution based on the quantized transform values rearranged by the re-arranger or the encoding parameter value calculated during the encoding process, etc. and then to output a bit stream. The entropy encoding method is a method of receiving a symbol having various values and expressing the symbol as a binary string that can be decoded while removing statistical redundancy thereof.

In this connection, the symbol means the to-be-encoded/ decoded syntax element, coding parameter, residual signal value and so on. The encoding parameter is required for encoding and decoding. The encoding parameter may contain information that can be inferred during encoding or decoding, as well as information encoded in an encoder and passed to a decoder like the syntax element. The encoding parameter is the information needed to encode or decode the image. The encoding parameter may include statistics or values such as for example, the intra/inter prediction mode, movement/motion vector, reference picture index, coding block pattern, residual signal presence or absence, transform coefficient, quantized transform coefficient, quantization parameter, block size, block partitioning information, etc. Further, the residual signal may mean a difference between an original signal and a prediction signal. Further, the difference between the original signal and the prediction signal may be transformed to define the residual signal, or the difference between the original signal and the prediction signal may be transformed and quantized to define the residual signal. The residual signal can be called as a residual block in a block unit, and can be called as a residual sample in a sample unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Therefore, the compression performance of image encoding may be increased via the entropy encoding.

Encoding schemes such as exponential golomb, Context-Adaptive Variable Length Coding (CAVLC), and Context-Adaptive Binary Arithmetic Coding (CABAC) may be used for the entropy encoding. For example, the entropy encoder 130 may store therein a table for performing entropy encoding, such as a variable length coding/code (VLC) table. The entropy encoder 130 may perform entropy encoding using the stored VLC table. Further, the entropy encoder 130 derives a binarization method of a corresponding symbol and a probability model of a corresponding symbol/bin, and then performs entropy encoding using the derived binarization method or probability model.

The entropy encoder 130 may give a predetermined change to a parameter set or syntaxes to be transmitted, if necessary.

The dequantizer 135 dequantizes the values transform coefficients quantized by the quantizer 120. The inverse transformer 140 inversely transforms the values dequantized by the dequantizer 135.

The residual value or residual sample or residual sample array generated by the dequantizer 135 and the inverse-transformer 140, and the prediction block predicted by the predictor 110 may be combined to form a reconstructed block including a reconstructed sample or a reconstructed sample array.

In FIG. 1, a residual block and a prediction block are added to create a reconstructed block by an adder. At this time, the adder may be considered as a particular element reconstructed block generator that generates a reconstructed block.

The filter 145 applies a deblocking filter, an ALF Adaptive Loop Filter, an SAO Sample Adaptive Offset to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filter 145 may not perform a filtering operation on the reconstructed block used in the inter prediction.

The memory 150 may store the reconstructed block or picture calculated by the filter 145. The reconstructed block or picture stored in the memory 150 may be supplied to the predictor 110 that performs the inter prediction.

Figure 2:
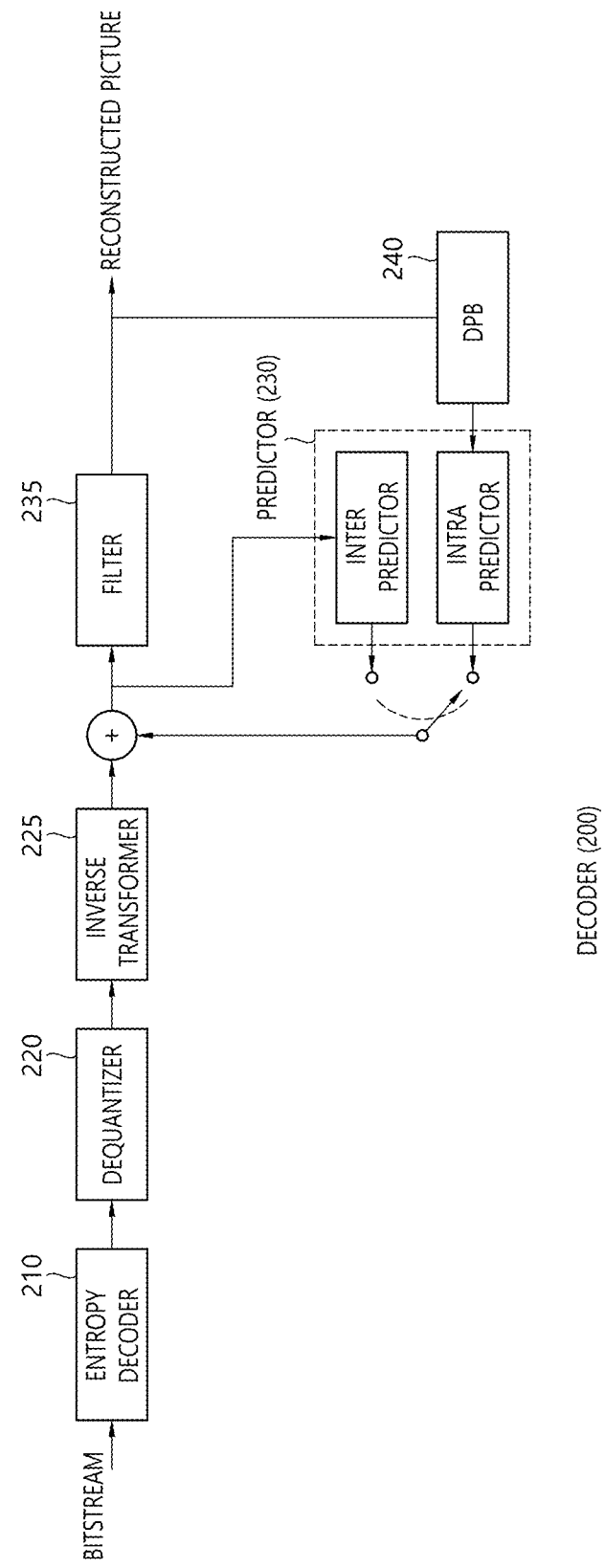
FIG. 2 is a block diagram schematically illustrating a video decoder according to an embodiment of the invention.

FIG. 2 is a block diagram schematically illustrating a video decoder according to an embodiment of the invention. Referring to FIG. 2, a video decoder 200 may include an entropy decoder 210, a dequantizer 220, an inverse transformer 225, a predictor 230, a filter 235, and a memory 240. The memory 240 may include or be referred to as a Decoded Picture Buffer (DPB). FIG. shows that an inter predictor and an intra predictor are configured separately, but it is merely an example and the decoder 200 may include a predictor 230 including the inter predictor and the intra predictor. In addition, although not illustrated in the drawing, the encoder may include a re-arranger.

When a video bitstream is input from the video encoder, the input bitstream may be decoded on the basis of the order in which video information is processed by the video encoder.

The entropy decoder 210 may entropy-decode the input bitstream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a Variable Length Coding VLC (hereinafter referred to as 'VLC') such as CAVLC is used to perform entropy encoding in a video encoder, the entropy decoder 210 may perform decoding using the same VLC table as the encoder used in the encoder. Further, when CABAC is used to perform entropy encoding in a video encoder, the entropy decoder 210 may perform the entropy decoding using CABAC.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a prediction block out of the information decoded by the entropy decoder 210 may be supplied to the predictor 230, and the residual values, that is, the quantized transform coefficients, entropy-decoded by the entropy decoder 210 may be input to a re-arranger.

The re-arranger may rearrange the bitstream information, that is, the quantized transform coefficients, entropy-decoded by the entropy decoder 210 on the basis of the rearrangement method in the video encoder.

The re-arranger may reconstruct and rearrange the coefficients expressed in the form of a one-dimensional vector into coefficients in the form of a two-dimensional block. The re-arranger may scan the coefficients on the basis of the prediction mode applied to the current block transform block and the size of the transform block and may create an array of coefficients quantized transform coefficients in the form of a two-dimensional block.

The dequantizer 220 may perform dequantization on the basis of the quantization parameters supplied from the video encoder and the coefficient values of the rearranged block.

The inverse transformer 225 may perform the inverse DCT and/or inverse DST of the DCT and/or DST, which has been performed by the transformer of the video encoder, on the quantization result from the video encoder.

The inverse transform may be performed on the basis of a transfer unit or a partition unit of a picture determined by the video encoder. The transformer of the video encoder may selectively perform the DCT and/or DST depending on plural information pieces such as the prediction method, the size of a current block, and the prediction direction, and the inverse transformer 225 of the video decoder may perform the inverse transform on the basis of the transform information on the transform performed by the transformer of the video encoder.

The predictor 230 generates a prediction block including a prediction sample or a prediction sample array based on the prediction block generation-related information provided by the entropy decoder 210 and the previously decoded block and/or picture information provided from the memory 240.

If the prediction mode for the current PU is the intra prediction mode, the predictor 230 may perform the intra prediction to generate a prediction block based on pixel information in the current picture.

If the prediction mode for the current PU is the inter prediction mode, the predictor 230 may be configured to perform inter prediction on a current PU based on information included in at least one picture of a previous picture or a subsequent picture to the current picture. In this connection, information about the motion information necessary for inter prediction of the current PU provided in the video encoder, such as motion vector and reference picture index may be deduced via checking the skip flag and merge flag received from the encoder.

The predictor 230 may generate a prediction block such that the residual signal relative to the current block is minimized and the motion vector size is minimized when inter prediction is performed on the current picture.

On the other hand, the motion information derivation method may be changed according to the prediction mode of the current block. The prediction mode applied to inter prediction may include an Advanced Motion Vector Prediction (AMVP) mode, a merge mode, and the like.

In one example, when the merge mode is applied, the encoder and decoder may generate a merge candidate list using a motion vector for a reconstructed spatial neighboring block and/or is a motion vector corresponding to a Col block as a temporal neighboring block. In the merge mode, a motion vector of a candidate block selected from the merge candidate list is used as a motion vector of a current block. The encoder may transmit to the decoder a merge index indicating a candidate block having an optimal motion vector as selected from candidate blocks included in the merge candidate list. In this connection, the decoder may derive a motion vector for the current block using the merge index.

In another example, when the AMVP (Advanced Motion Vector Prediction) mode is applied, the encoder and decoder generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoder may transmit to the decoder a prediction motion vector index indicating the optimal motion vector selected from among the motion vector candidates included in the motion vector predictor candidate list. In this connection, the decoder may select the prediction motion vector for the current block from the motion vector candidates included in the motion information candidate list using the motion vector index.

The encoder may obtain the motion vector difference MVD between the motion vector for the current block and the motion vector predictor, encode the MVD, and transmit the encoded MVD to the decoder. That is, the MVD may be a value obtained by subtracting the motion vector predictor (MVP) from the motion vector (MV) for the current block. In this connection, the decoder may decode the received motion vector difference, and derive the motion vector for the current block via addition between the decoded motion vector difference and the motion vector predictor.

Further, the encoder may transmit a reference picture index indicating a reference picture to the decoder.

The decoder may predict the motion vector of the current block using the motion information of the neighboring block and derive the motion vector of the current block using the residual received from the encoder. The decoder may generate the prediction block for the current block based on the derived motion vector and the reference picture index information received from the encoder.

In another example, when the merge mode is applied, the encoder and decoder may generate a merge candidate list using the motion information of the reconstructed neighboring block and/or the motion information of the Col block. That is, when the reconstructed neighboring block and/or the motion information of the Col block exists, the encoder and decoder may use the reconstructed neighboring block and/or the motion information of the Col block as a merge candidate for the current block.

The encoder may select a merge candidate that provides optimal encoding efficiency among the merge candidates included in the merge candidate list as the motion information for the current block. In this connection, a merge index indicating the selected merge candidate may be included in the bitstream which is transmitted to the decoder. The decoder may select one of the merge candidates included in the merge candidate list using the transmitted merge index, and the decoder may determine the selected merge candidate as motion information of the current block. Therefore, when the merge mode is applied, the motion information of the reconstructed neighboring block and/or the Col block may be used as the motion information for the current block as it is. The decoder may reconstruct the current block by adding the prediction block and the residual transmitted from the encoder to each other.

In the above-described AMVP and merge modes, motion information of the reconstructed neighboring block and/or motion information of the Col block may be used to derive motion information of the current block.

In the skip mode, which is one of the other modes used for inter-picture prediction, neighboring block information may be used for the current block as it is. Therefore, in the case of skip mode, the encoder does not transmit syntax information such as the residual to the decoder in addition to information indicating which blocks motion information to use as the motion information for the current block.

The encoder and the decoder may generate a prediction block of the current block by performing motion compensation on the current block based on the derived motion information. In this connection, a prediction block may refer to a motion-compensated block as generated by performing motion compensation on the current block. Further, a plurality of motion compensated blocks may constitute a single motion compensated image.

The reconstructed block may be generated using the prediction block generated by the predictor 230 and the residual block provided by the inverse-transformer 225. FIG. 2 illustrates that using the adder, the prediction block and the residual block are combined to generate the reconstructed block. In this connection, the adder may be viewed as a separate element (a reconstructed block generator) that is configured to generate the reconstructed block. In this connection, the reconstructed block includes a reconstructed sample or a reconstructed sample array as described above; the prediction block includes a prediction sample or a prediction sample array; the residual block may include a residual sample or a residual sample array. Therefore, the reconstructed sample or the reconstructed sample array can be considered to be generated by combining the corresponding prediction sample or prediction sample array with the corresponding residual sample or residual sample array.

For a block that the skip mode is applied, the residual signal may not be transmitted and the prediction block may be used as a reconstructed block.

The reconstructed block and/or picture may be supplied to the filter 235. The filter 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output module.

The elements that is directly related to decoding images among the entropy decoder 210, the re-arranger 215, the dequantizer 220, the inverse transformer 225, the predictor 230, the filter 235 and the memory 240 which are included in the video decoder 200, for example, the entropy decoder 210, the re-arranger, the dequantizer 220, the inverse transformer 225, the predictor 230, the filter 235, and so on may be expressed as a decoder or a decoding unit that is distinguished from other elements.

In addition, the video decoder 200 may further include a parsor not shown in the drawing that parses information related to the encoded images included in a bitstream. The parsor may include the entropy decoder 210, and may be included in the entropy decoder 210. Such a parsor may also be implemented as an element of the decoding unit.

As described above, the encoder may generate a prediction block of the current block on the basis of inter prediction by the inter predictor or intra prediction by intra predictor, generate a residual signal based on the prediction block, and perform encoding through a transformer, a quantizer, and an inverse transformer. In this case, the prediction block generated by the inter predictor or the intra predictor may be a prediction block of a spatial domain.

As described above, if a prediction block of the current block is generated in an intra prediction mode in the current video coding system, it is possible to generate the prediction block independently, without using information about a block neighboring the current block, that is, a neighboring block of the current block. In other words, it is possible to generate the prediction block of the current block only using a neighboring reference sample of the current block without consideration of information about the neighboring block.

However, techniques, such as a Most Probable Mode (MPM), for enhancing prediction efficiency using information about the neighboring block in an intra prediction mode may be used. Even the present invention proposes a method of selecting a block the most similar to the current block in neighboring blocks, deriving a reconstructed sample and a prediction sample of the selected neighboring sample, and using a correlation between the reconstructed sample and a prediction sample to generate a prediction sample of the current block. This method may be referred to as linear modeling based intra prediction (LMIP).

Meanwhile, a method according to the present invention may be applied not just to the case of applying an intra prediction mode to the current block, but to the case of applying an inter prediction mode to the current block, so that prediction efficiency is enhanced.

Figure 3:
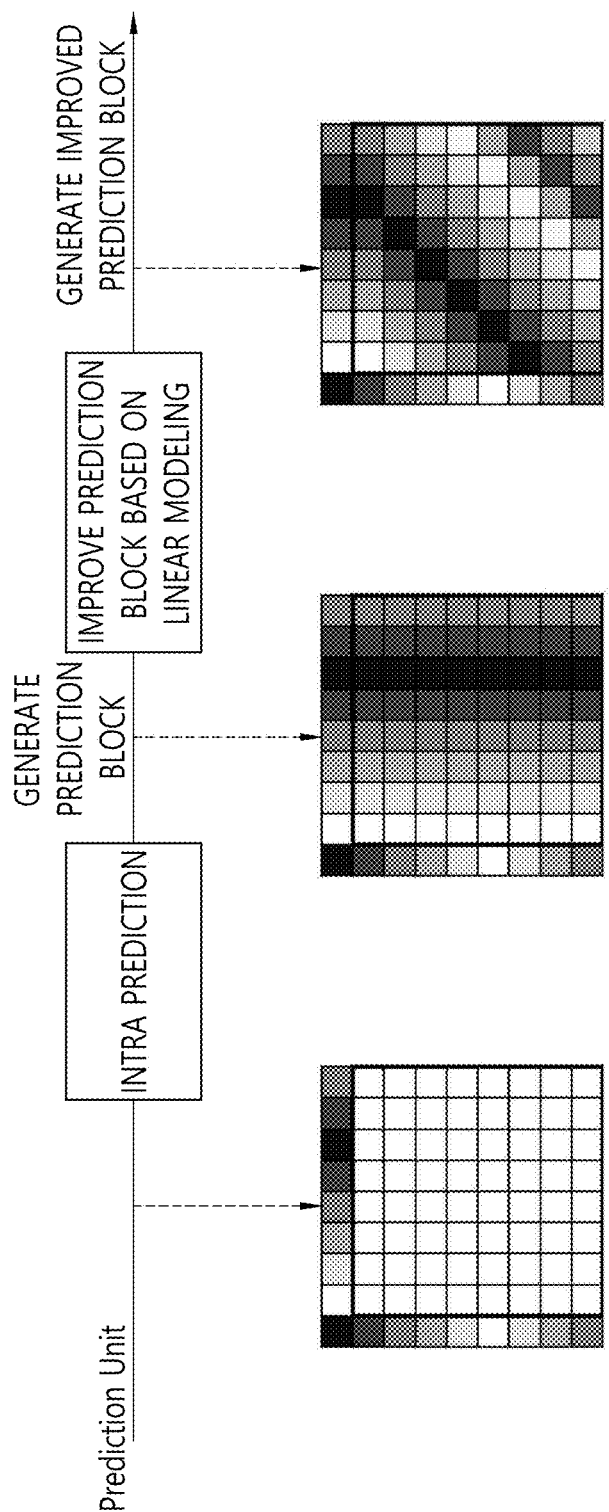
FIG. 3 shows an example of a linear modeling-based intra prediction mode.

FIG. 3 shows an example of a linear modeling-based intra prediction mode. Referring to FIG. 3, an encoder/decoder may generate a prediction block based on a derived intra prediction mode. In addition, the encoder/decoder may select one of neighboring blocks of the current block, and derive correlation information based on a reconstructed block of the neighboring block and a prediction block of the neighboring block. That is, it is possible to derive correlation information for improving the prediction block, based on the reconstructed block of the neighboring block and the prediction block of the neighboring block. The encoder/decoder may derive a modified prediction block of the current block based on the correlation mode when the prediction mode of the current block is an intra prediction mode.

The correlation information may be derived through linear modeling for the reconstructed block of the neighboring block and the prediction block of the neighboring block. The correlation information may include information on a weight and an offset and/or information on a difference value corresponding to a sample, and derive a modified prediction block that has improved based on the prediction block of the current block and the correlation information.

Figure 4:
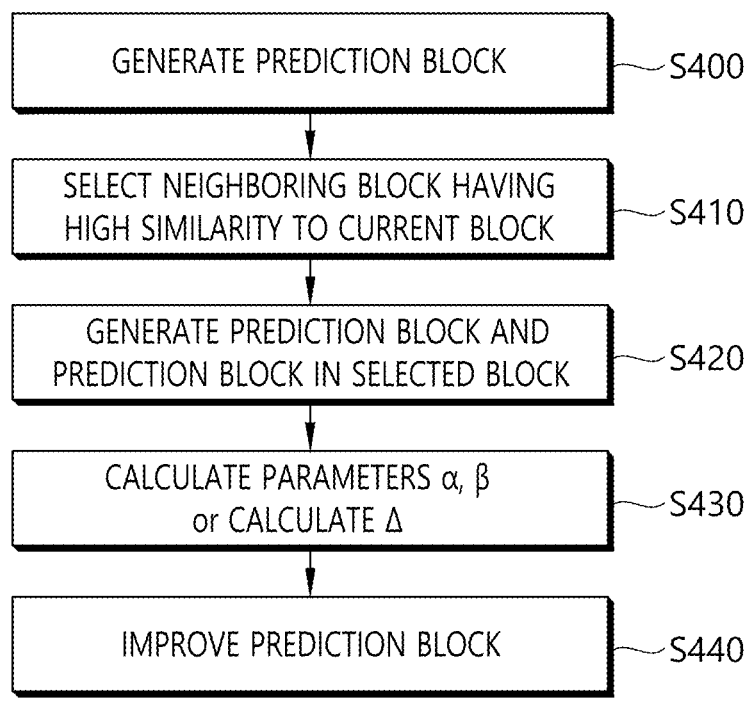
FIG. 4 shows an example of a method for deriving a modified prediction block of the current block.

FIG. 4 shows an example of a method for deriving the modified prediction block of the current block. Referring to FIG. 4, an encoder/decoder may derive a modified prediction block by improving a prediction block of the current block which is generated in a prediction mode. The prediction mode may be either an intra prediction mode or an inter prediction mode.

The encoder/decoder may derive prediction of the current block to be encoded/decoded, and generate a prediction block of the current block based on the prediction mode in S400.

After generating the prediction block, the encoder/decoder may select a neighboring block having high similarity to the current block in S410. The neighboring block having high similarity to the current block may be selected using a sum of absolute difference (SAD) or a sum of squared differences (SSD) between the prediction block of the current block and the neighboring block. That is, the neighboring block having high similarity to the current block may be selected based on a difference value between a sample of a prediction block of the current block and a sample of the neighboring block, according to a phase. For example, the encoder may select a neighboring block that has the smallest difference value between samples relative to the current block among neighboring blocks of the current block, according to a phase.

In addition, the neighboring block having high similarity to the current block may be selected through rate distortion optimization (RDO) that depends on a relationship between a prediction block of the current block and a neighboring block of the current block. For example, the neighboring block having high similarity to the current block may be derived to be a neighboring block that minimizes a rate distortion (RD) cost according to the method of the present invention. That is, the encoder may derive a modified prediction block of the current block using each neighboring block, and select a neighboring block of a modified prediction block having the highest similarity, by comparing each modified prediction block and the original block of the current block.

To select a neighboring block having high similarity to the current block, other various methods may be used, and similarity between the current block and each neighboring block may be compared.

After selecting the neighboring block, the encoder/decoder may derive a reconstructed block of the neighboring block and a prediction block of the neighboring block in S420.

The encoder/decoder may calculate parameters α and β or a parameter Δ based on the reconstructed block and the prediction block in S430. That is, the encoder/decoder may derive correlation information based on the reconstructed block of the neighboring block and the prediction block of the neighboring block. In other words, the encoder/decoder may derive correlation information about the prediction block of the current block based on the reconstructed block of the neighboring block and the prediction block of the neighboring block.

For example, the encoder/decoder may derive a weight and an offset from the reconstructed block and the prediction block through Least Square Method (LSM) in order to improve the current block. Information on the weight and the offset may be included in the correlation information.

For example, the encoder/decoder may derive difference values between samples of the reconstructed block and the prediction block. Information on the differences may be included in the correlation information.

The encoder/decoder may improve the prediction block of the current block based on the weight and the offset, or may improve the prediction block of the current block based on the difference values in S440. That is, the encoder/decoder may derive a modified prediction block of the current block based on the prediction block of the current block and the correlation information.

Figure 5:
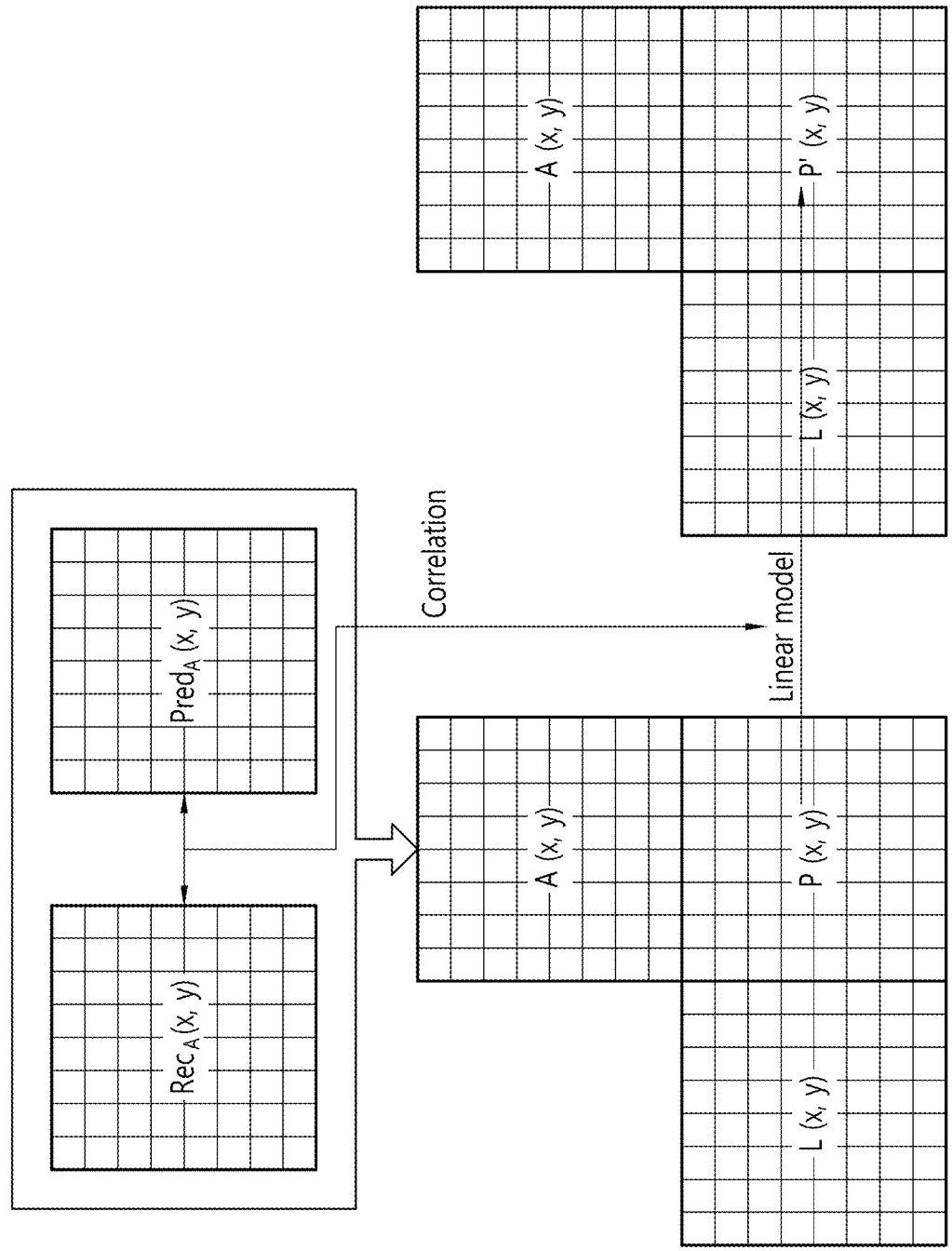
FIG. 5 shows an example of improving a prediction block of the current block through linear modeling with respect to correlation between a reconstructed block of a neighboring block and a prediction block of the neighboring block.

FIG. 5 shows an example of improving a prediction block of the current block through linear modeling with respect to correlation between a reconstructed block of a neighboring block and a prediction block of the neighboring block. Referring to FIG. 5, correlation information, which is information on correlation between a reconstructed block (or a reconstructed sample) of a neighboring block of the current block and a prediction block (or a prediction sample) of the neighboring block, may be derived through linear modeling. The correlation information may include information on a weight and an offset, and a modified prediction block of the current block may be derived based on the weight and the offset. The weight and the offset may be applied on the basis of block unit, and the weight may be called a weight per block unit, and the offset may be called an offset per block unit.

FIG. 5 may show a method of deriving a modified prediction sample of the current block from correlation information of the neighboring block. As shown in FIG. 5, a modified prediction block P' of the current block may be derived based on correlation information, which is derived through the linear modeling from a prediction block P generated in a prediction mode. The modified prediction block P' may be derived based on an equation as below:

$$P'(x,y)=\alpha P(x,y)+\beta \qquad \text{[Equation 1]}$$

where P(x,y) denotes a prediction sample value of the prediction block of the current block, P'(x,y) denotes a prediction sample value of the modified prediction block of the current block, α denotes the weight per block unit, and β denotes the offset per block unit. The weight per block unit and the offset per block unit may be derived based on the LSM. The LSM may be called the method of least squares. The weight per block unit may be derived based on an equation as below:

$$\alpha = \frac{R(Pred_A, Rec_A)}{R(Pred_A, Pred_A)} \quad \text{[Equation 2]}$$

where PredA denotes a prediction block of the neighboring block, and RecA denotes a reconstructed block of the neighboring block. R(A,B) may be derived based on an equation as below.

$$R(A,B) = M((A-M(A)) \times (B-M(B))) \quad \text{[Equation 3]}$$

where M(A) denotes a mean of A, and M(B) denotes a mean of B.

The offset per block unit may be derived based on an equation as below.

$$\beta = M(Rec_A) - \alpha M(Pred_A) \quad \text{[Equation 4]}$$

where α denotes the weight per block unit.

Using the above equations, it is possible to derive specific equations about the weight per block unit and the offset per block unit, which are derived through the LSM applied to the reconstructed sample of the neighboring block and the prediction sample of the neighboring block. The specific equations about the weight per block unit and the offset per block unit may be calculated as in an equation as below:

If the prediction block of the current block includes I number of samples, the weight per block unit may be derived based on an equation as below:

$$\alpha = \frac{I \cdot \sum_{i=1}^{I} Rec_A(i) \cdot Pred_A(i) - \sum_{i=1}^{I} Rec_A(i) \cdot \sum_{i=1}^{I} Pred_A(i)}{I \cdot \sum_{i=1}^{I} Pred_A(i) \cdot Pred_A(i) - \left(\sum_{i=1}^{I} Pred_A(i)\right)^2} \quad \text{[Equation 5]}$$

where PredA(i) denotes the ith prediction sample of the prediction block of the neighboring block, and RecA(i) denotes the ith reconstructed sample value of the reconstructed block of the neighboring block.

If there is I number of samples included in the prediction block of the current block, the offset per block unit may be derived based on an equation as below:

$$\beta = \frac{\sum_{i=1}^{I} Rec_A(i) - \alpha \cdot \sum_{i=1}^{I} Pred_A(i)}{I} \quad \text{[Equation 6]}$$

where α denotes the weight per block unit.

The modified prediction block of the current block may be derived by applying a weight per block unit α and a weight per block unit β, which are calculated through the LSM with respect to the reconstructed sample of the neighboring block and the prediction sample of the neighboring block, to Equation 1.

As described above, correlation information per block unit may be derived based on the reconstructed block of the neighboring block and the prediction block of the neighboring block: however, correlation information indicating correlation between the reconstructed block of the neighboring block and the prediction block of the neighboring block may be derived through linear modeling of each sample unit included in a block, and a modified prediction block of the current block may be derived based on the correlation information derived through the linear modeling. That is, it is possible to derive a weight per sample unit and an offset per sample unit, each of which corresponds to each prediction sample of a prediction block of the current block, and to derive a modified prediction block of the current block by applying the weight per sample unit and the offset per sample unit to each prediction sample. Thus, the optimal weight per sample unit and the optimal offset per sample unit for a prediction sample of the current block may be derived through linear modeling with respect to a reconstructed sample of the neighboring block and a prediction sample of the neighboring block, each of which corresponds to each prediction sample of the prediction block of the current block, and the modified prediction block may be derived by applying the weight per sample unit and the offset per sample unit to each prediction sample of the prediction block of the current block. That is, the method in the example of FIG. 5 may be a broad method of improving the prediction block of the current block, and a method in the following example is a local method of improving the prediction block of the current block on the basis of sample unit.

Figure 6:
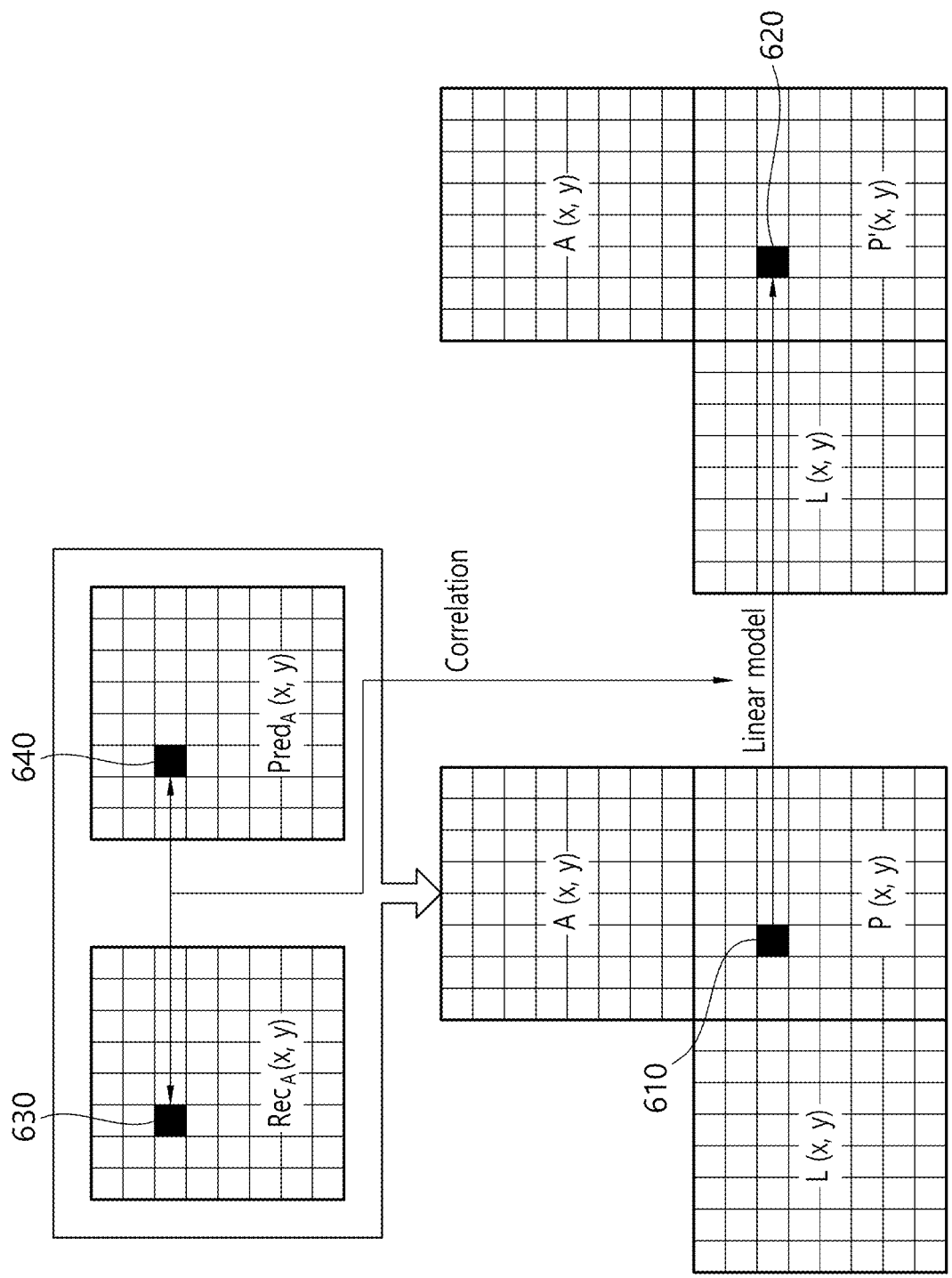
FIG. 6 shows an example of a method of improving a prediction block of the current block based on correlation information per sample unit.

FIG. 6 shows an example of a method of improving a prediction block of the current block based on correlation information per sample unit. Referring to FIG. 6, the correlation information per sample unit may be derived from information on a neighboring block of the current block, that is, through linear modeling with respect to a reconstructed block of the neighboring block and a prediction block of the neighboring block, and modified prediction samples of a modified prediction block of the current block may be derived based on the correlation information per sample unit. A prediction sample 610 of the current block indicates a prediction sample of the current block that is a target from which a sample of the modified prediction block is to be derived. As shown in FIG. 6, a prediction block of the current block is derived based on a prediction mode, and a modified prediction sample 620 corresponding to the prediction sample may be derived by applying a weight per sample unit and an offset per sample unit, which are related to the prediction sample 610, to the prediction sample 610. The weight per sample unit and the offset per sample unit may be derived based on a first region, including a reconstructed sample 630 of the neighboring block corresponding the prediction sample 610, and a second region, including a prediction sample 640 of the neighboring block corresponding to the prediction sample 610. The first region may be called a first mask, and the second region may be called a second mask. The first region and the second region may have the same size. For example, the size of each of the first region and the second region may be 3×3, as shown in FIG. 6, 5×5, or any size other than the aforementioned sizes. As shown in FIG. 6, in the case where the size of each of the first region and the second region is 3×3, the weight per sample unit and the offset per sample unit of the prediction sample 610 of the current block may be derived based on reconstructed samples included in the first region and prediction samples included in the second region. The weight per sample unit may be derived based on the above Equation 5 which is about reconstructed samples included in the first region and prediction samples included in the second region. In addition, the offset per sample unit may be derived based on the above Equation 6 which is about reconstructed samples included in the first region and prediction samples of the second region. Since each of the first and second regions, each having the size of 3×3, shown in FIG. 6 includes 9 samples, the value of I in the above Equations 5 and 6 may be 9. By applying the aforementioned method to every sample in a prediction block of the current block, it is possible to improve the prediction block and derive the modified prediction block.

In the case of improving a prediction block of the current block based on information on a neighboring block of the current block, a modified prediction block of the current block may be derived by reflecting difference between a sample value of a reconstructed block of the neighboring block and a sample value of a prediction block of the neighboring block. That is, a difference value between samples of the reconstructed block and the prediction block, according to a phase, may be used to derive a modified prediction block of the current block.

Figure 7:
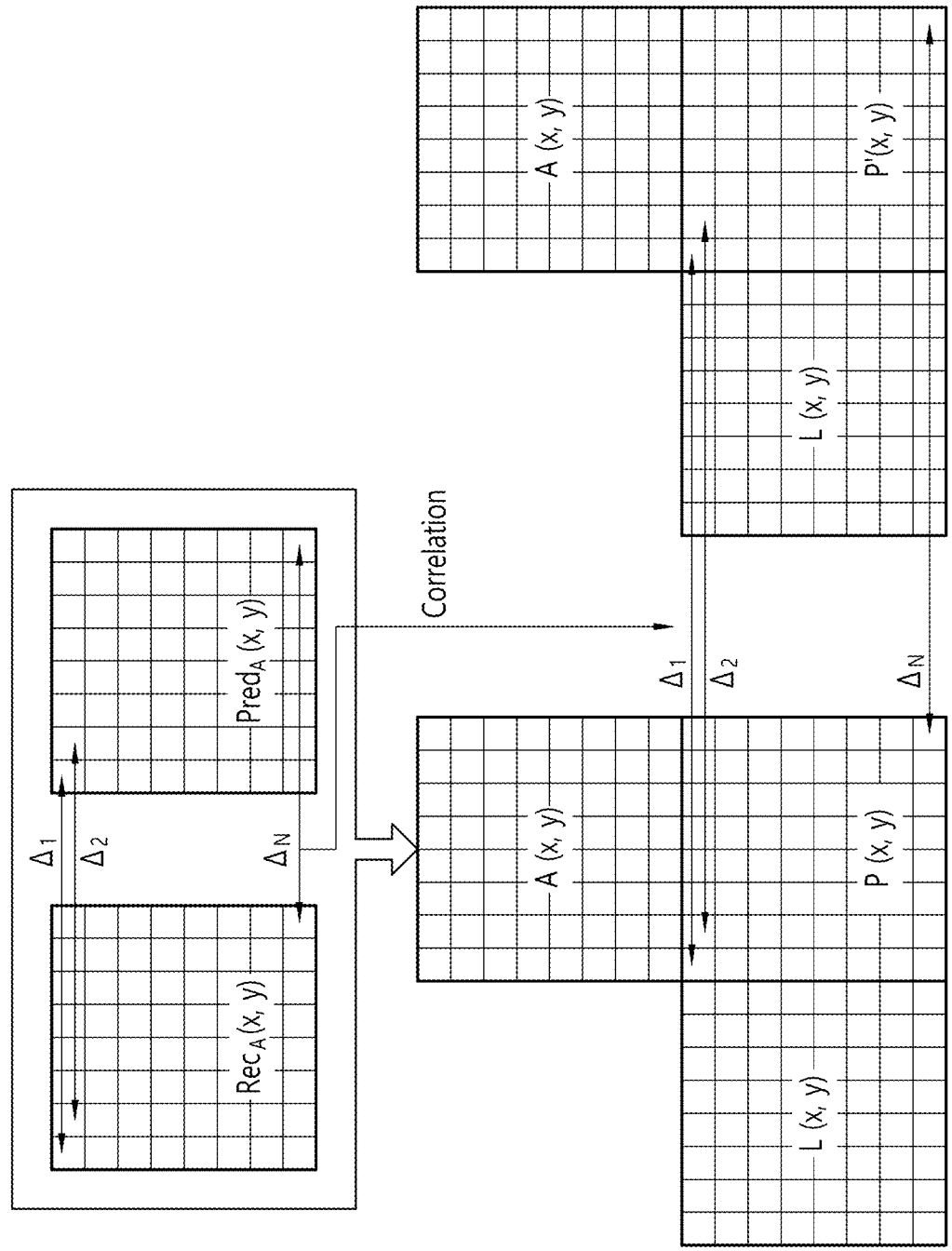
FIG. 7 shows an example of deriving a modified prediction sample of the current block by reflecting a difference value between samples, according to a phase, of the reconstructed block of the neighboring block and the prediction block of the neighboring block.

FIG. 7 shows an example of deriving a modified prediction sample of the current block by reflecting a difference value between samples of the reconstructed block of the neighboring block and the prediction block of the neighboring block, according to a phase.

As described above, the weight per block unit (or sample unit) and the offset per block unit (or sample unit) may be derived by performing LSM on a reconstructed block of the neighboring block and a prediction block of the prediction block, and the prediction block of the current block may improve based on the weight per block unit and the offset per sample unit. However, as shown in FIG. 7, the prediction block of the current block may improve based on difference values between samples of a reconstructed block of the neighboring block and a prediction block of the neighboring block, according to a phase. As shown in FIG. 7, the difference values may be derived on the basis of a sample unit, and the prediction block of the current block may improve using the difference values.

A specific example thereof may be as follows. A prediction block P of the current block may be generated based on a prediction mode of the current block, and a neighboring block which is the most similar to the current block may be selected. The neighboring block may be selected using a sum of absolute differences (SAD) or a sum of squared differences (SSD) between the prediction block of the current block and the neighboring block. That is, the neighboring block may be selected based on difference values between samples of the neighboring block compared to a prediction block of the current block, according to a phase. For example, the encoder may select a neighboring block that has the smallest difference value between samples compared to an original block of the current block among neighboring blocks of the current block, according to a phase.

In addition, a neighboring block having high similarity to the current block may be selected through rate distortion optimization that depends on a relationship between a prediction block of the current block and a neighboring block of the current block. For example, a neighboring block having high similarity to the current block may be derived as a neighboring block that minimizes a rate distortion (RD) cost according to a method of the present invention among neighboring blocks of the current block. That is, the encoder may derive each modified prediction block of the current block using each neighboring block, and select a neighboring block of a prediction block which is the most similar to the current block, by comparing each modified prediction block and the original block of the current block.

As shown in FIG. 7, the neighboring block may be selected as an upper neighboring block of the current block. A reconstructed block of the neighboring block and a prediction block of the neighboring block may be derived, and difference values between samples of the reconstructed block and the prediction block, according to a phase. In the case where a prediction block of the current block includes N number of samples, the difference values may be derived based on an equation as below.

$$\Delta_1 = Rec_A(0, 0) - Pred_A(0, 0) \qquad \text{[Equation 7]}$$
$$\Delta_2 = Rec_A(0, 1) - Pred_A(0, 1)$$
$$\vdots$$
$$\Delta_N = Rec_A(\sqrt{N}, \sqrt{N}) - Pred_A(\sqrt{N}, \sqrt{N})$$

where $\Delta N$ denotes the Nth difference value, $RecA(x,y)$ denotes a reconstructed sample value of a reconstructed block at coordinates (x, y) of the selected upper neighboring block, and a prediction sample value of a prediction block at coordinates (x, y) of the selected upper neighboring block.

A modified prediction block of the current block may be derived by applying the derived difference values to each sample of a prediction block of the current block. The modified prediction block may be derived based on an equation as below:

$$P'(0, 0) = P(0, 0) + \Delta_1 \qquad \text{[Equation 8]}$$
$$P'(0, 1) = P(0, 1) + \Delta_2$$
$$\vdots$$
$$P'(\sqrt{N}, \sqrt{N}) = P(\sqrt{N}, \sqrt{N}) + \Delta_N$$

where P(x, y) denotes a prediction sample value of the prediction block at coordinates (x, y) of the current block, P'(x, y) denotes a (modified) prediction sample value of a modified prediction block at coordinates (x, y) of the current block, and $\Delta N$ denotes the Nth difference. The encoder/decoder may improve the prediction block based on above Equation 8.

Figure 8:
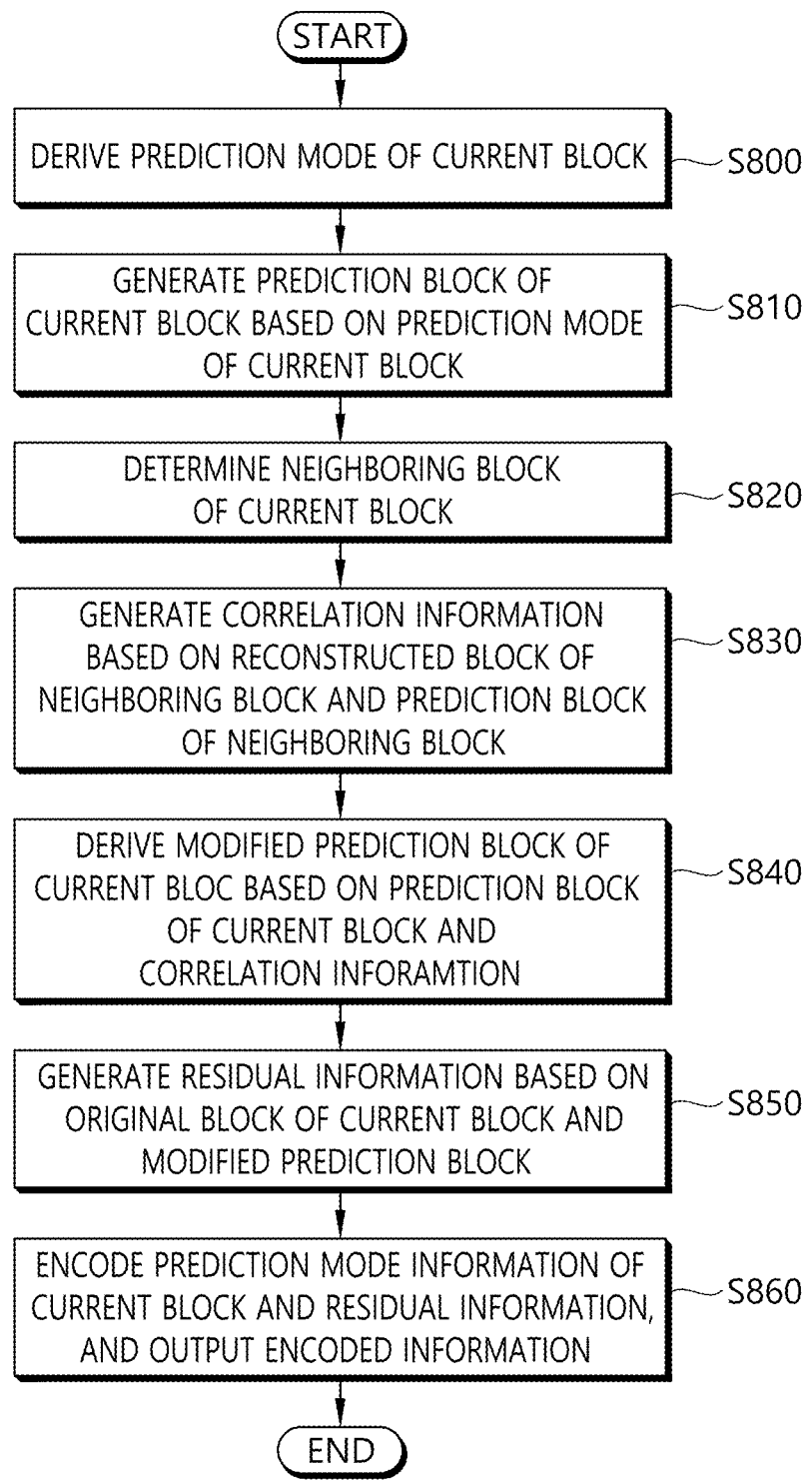
FIG. 8 schematically shows a video encoding method by an encoder according to the present invention.

FIG. 8 schematically shows a video encoding method by an encoder according to the present invention. The method shown in FIG. 8 may be performed by the encoder shown in FIG. 1. Specifically, for example, operations S800 to S850 in FIG. 8 may be performed by the predictor of the encoder, and operation S860 may be performed by the entropy encoder of the encoder.

The encoder derives a prediction mode of the current block in S800. The encoder may perform various prediction modes to derive a prediction mode having the optimal RD cost as a prediction mode for the current block.

The encoder generates a prediction block of the current block based on the prediction mode of the current block in S810. The encoder may generate the prediction block of the current block through the prediction mode of the current block, as described above.

The encoder determines a neighboring block of the current block in S820. The neighboring block may be one of neighboring blocks of the current block. For example, the neighboring blocks may include at least one of a left neighboring block, an upper left neighboring block, an upper neighboring block, an upper right neighboring block, or a lower left neighboring block of the current block.

The neighboring block may be determined based on a difference values between samples, according to a phase, of the neighboring block relative to the current block. For example, as the neighboring block of the current block, the encoder may select a neighboring block that has the smallest difference value between samples, according to a phase, relative to the current block among neighboring blocks of the current block. Specifically, the neighboring block may be a neighboring block that has the smallest difference value between an absolute value of a sample value of the current block and an absolute value of a sample value of the neighboring block among neighboring blocks of the current block, and the neighboring block may be a neighboring block that has the smallest difference value between a square value of a sample value of the current block and a square value of a sample value of the neighboring block.

In addition, the neighboring block may be selected through RDO that depends on a relationship between a prediction block of the current block and a neighboring block of the current block. For example, the neighboring block may be derived to be a neighboring block that minimizes a RD cost according to the method of the present invention among neighboring blocks of the current block. That is, the encoder may derive a modified prediction block of the current block using each neighboring block, and select a neighboring block of a prediction block which is the most similar to the current block, by compare each modified prediction block and an original block of the current block.

The encoder generates correlation information based on a reconstructed block of the neighboring block and a prediction block of the neighboring block in S830. The encoder may generate information about improvement of the prediction block of the current block, based on the reconstructed block of the neighboring block and the prediction block of the neighboring block. The correlation information may be derived through linear modeling with respect to the reconstructed block of the neighboring block and the prediction block of the neighboring block.

In one example, the correlation information may include information on a weight per block unit and an offset per block unit. The weight per block unit and the offset per block unit may be derived through the LSM with respect to values of reconstructed samples included in the reconstructed block of the neighboring block and values prediction samples included in the prediction block of the neighboring block. The LSM may be called the method of least squares. In this case, the weight per block unit may be derived based on the above Equation 5, and the offset per block unit may be derived based on the above Equation 6.

In another example, the correlation information may include information on a weight per sample unit and an offset per sample unit. The weight per sample unit and the offset per sample unit may be derived through the LSM with respect to values of reconstructed samples in a first region of the reconstructed block of the neighboring block, the first region located corresponding to a prediction sample of the prediction block of the current block, and values of prediction samples in a second region of the prediction block of the neighboring block, the second region corresponding to the first region. The first region and the second region may have the same size, and the size of each of the first region and the second region may be 3×3 or 5×5 size. The weight per sample unit may be derived based on the above Equation 5, and the offset per sample unit may be derived based on the above Equation 6.

In yet another example, the correlation information may include information on a difference value corresponding to each prediction sample included in the prediction block of the current block. The difference value corresponding to a prediction sample of the prediction block of the current block may be derived as a difference value between a reconstructed sample value of a reconstructed block of the neighboring block corresponding to the prediction sample of the prediction block of the current block and a prediction sample value of a prediction block of the neighboring block corresponding to the prediction sample of the prediction block of the current block. The difference value may be derived based on the above Equation 7.

The encoder derives a modified prediction block of the current block based on the prediction block and the correlation information in S840. The encoder may derive the modified prediction block by applying the correlation information to the prediction block.

In one example, in the case where the correlation information includes information on the weight per block unit and the offset per block unit for the prediction block, the encoder may multiply prediction sample values of the prediction block by the weight per block unit and add the offset per block unit to thereby derive modified prediction sample values of the modified prediction block. The modified prediction samples of the modified prediction block may be derived based on the above Equation 1.

In another example, in the case where the correlation information include information on the weight per sample unit and the offset per sample unit for each sample included in the prediction block, the encoder may multiply a prediction sample value of a prediction sample of the prediction block by the weight per sample unit of the prediction sample, and add the offset per sample unit of the prediction sample to thereby derive a modified prediction sample value of a modified prediction sample of the modified prediction block which corresponds to the prediction sample value of the prediction sample of the prediction block. By applying the aforementioned method may be applied to each prediction sample of the prediction block, the modified prediction block may be derived. The modified prediction sample value of the modified prediction block may be derived based on the above Equation 1.

In yet another example, in the case where the correlation information includes information on a difference value corresponding to each sample included in the prediction block, the encoder may add the difference value corresponding to the prediction sample to a prediction sample value of each prediction sample included in the prediction block to thereby derive a modified prediction sample value of a modified prediction sample of the modified prediction block corresponding to the prediction sample. By applying the aforementioned method to each prediction sample of the prediction block, the modified prediction block may be derived. A modified prediction sample value of the modified prediction block may be derived based on the above Equation 8.

The encoder generates residual information based on the original block of the current block and the modified prediction block in S850. The encoder may generate difference values between samples, according to a phase, of the original block of the current block and the modified prediction block: that is, the encoder may generate residual information.

The encoder encodes prediction mode information about the current block and the residual information, and outputs the encoded information in S860. The encoder may generate prediction mode information indicating the prediction mode, encode the prediction mode information, and output the encoded prediction mode information in the form of a bitstream. In addition, the encoder may generate the residual information, encode the residual information, and output the encoded residual information in the form of a bitstream. The residual information may include coefficients about a residual sample. The bit stream may be transmitted to the decoder via a network or a storage medium.

FIG. 9 schematically shows a video decoding method by a decoder according to the present invention. The method shown in FIG. 9 may be performed by the decoder shown in FIG. 1. Specifically, for example, operation S900 in FIG. 9 may be performed by the entropy decoder of the decoder, and operations S910 to S950 may be performed by the predictor of the decoder.

The decoder derives a prediction mode of the current block in S900. The decoder may derive a prediction mode optimal for the current block based on information on a prediction mode, the information which is acquired through a bitstream. The bitstream may be received from the encoder via a network or a storage medium. The information on a prediction mode may be information on an intra prediction mode or information on an inter prediction mode.

Meanwhile, the decoder may acquire residual information of the current block through the bit stream. The residual information may be generated based on a modified prediction block of the current block and the original block of the current block. By deriving the modified prediction block, it is possible to reduce an amount of data of the residual information and therefore enhance overall coding efficiency.

The decoder generates a prediction block of the current block based on a prediction mode of the current block in S910. The decoder may generate the prediction block depending on an intra prediction mode, or may generate the prediction mode depending on an inter prediction mode.

The decoder derives a neighboring block of the current block in S920. The neighboring block may be one of neighboring blocks of the current block. For example, the neighboring blocks may include at least one of a left neighboring block, an upper left neighboring block, an upper neighboring block, an upper right neighboring block, or a lower left neighboring block of the current block.

The neighboring block may be derived based on difference values between samples, according to a phase, of the current block and the neighboring block. For example, as the neighboring block of the current block, the decoder may select a neighboring block that has the smallest difference value between samples, according to a phase, of relative to current block among neighboring blocks of the current block. Specifically, the neighboring block may be a neighboring block that has the smallest difference value between an absolute value of a sample value of the current block and an absolute value of a sample value of the neighboring block among neighboring blocks of the current block, and the neighboring block may be a neighboring block that has the smallest difference value between a square value of a sample value of the current block and a square value of a sample value of the neighboring block among neighboring blocks of the current block.

Alternatively, the neighboring block may be selected by the encoder and signaled to the decoder. For example, the encoder may select the neighboring block through RDO, which depends on a relationship between a prediction block of the current block and a neighboring block of the current block, and transmit information indicating the selected neighboring block to the decoder. For example, the correlation information may include index information indicating a specific block among the neighboring blocks, and the decoder may select (determine or derive) the specific neighboring block based on the index information. The index information may be referred to as correlated index information or linear model (LM) index information. The decoder derives correlation information based on a reconstructed block of the neighboring block and a prediction block of the neighboring block in S930. The correlation information may be derived through linear modeling with respect to the reconstructed block of the neighboring block and the prediction block of the neighboring block.

In one example, the correlation information may include information on a weight per block unit and an offset per block unit. The weight per block unit and the offset per block unit may be derived through the LSM with respect to values of reconstructed samples included in the reconstructed block of the neighboring block and values of prediction samples included in the prediction block of the neighboring block. The LSM may be called the method of least squares. In this case, the weight per block unit may be derived based on the above Equation 5, and the offset per block unit may be derived based on the above Equation 6.

In another example, the correlation information may include information on a weight per sample unit and an offset per sample unit. The weight per sample unit and the offset per sample unit may be derived through the LSM with respect to a values of reconstructed samples in a first region of the reconstructed block of the neighboring block, the first region located to correspond to a prediction sample of the prediction block of the current block, and values of prediction samples in a second region of the prediction block of the neighboring block, the second region corresponding to the first region. The first region and the second region may have the same size, and the size of each of the first region and the second region may be 3×3 or 5×5. The weight per sample unit may be derived based on the above Equation 5, and the offset per sample unit may be derived based on the above Equation 6.

In yet another example, the correlation information may include information on a difference value corresponding to each prediction sample included in the prediction block of the current block. The difference value corresponding to each prediction sample included in the prediction block of the current block may be derived as a difference value between a reconstructed sample value of a reconstructed block of the neighboring block, which corresponds to a prediction sample of the prediction block of the current block, and a prediction sample value of a prediction block of the neighboring block, which corresponds to a prediction sample of the prediction block of the current block. The difference may be derived based on the above Equation 7.

The decoder derives a modified prediction block of the current block based on the prediction block and the correlation information in S940. The decoder may derive the modified prediction block by applying the correlation information to the prediction block.

In one example, in the case where the correlation information includes information on the weight per block unit and the offset per block unit for the prediction block, the decoder may multiply prediction sample values of the prediction block by the weight per block unit and add the offset per block unit to thereby derive modified prediction sample values of the modified prediction block. A modified prediction sample value of the modified prediction block may be derived based on the above Equation 1.

In another example, in the case where the correlation information includes a weight per sample unit and an offset per sample unit with respect to every sample included in the prediction block, the decoder may multiply a prediction sample value of a prediction sample of the prediction block by the weight per sample unit and add the offset per sample unit of the prediction sample to thereby derive a modified prediction sample value of a modified prediction sample of the modified prediction block, which corresponds to a prediction sample of the prediction block. By applying the aforementioned method to each prediction sample of the prediction block, the modified prediction block may be derived. A modified prediction sample value of the modified prediction block may be derived based on the above Equation 1.

In yet another example, in the case where the correlation information includes information on a difference value corresponding to each prediction sample included in the prediction block, the decoder may add the difference value corresponding to the prediction sample to a prediction sample value of each prediction sample included in the prediction block to thereby derive a modified prediction sample value of a modified prediction sample of the modified prediction block, which corresponds to the prediction sample. By applying the aforementioned method to each prediction sample of the prediction block, the modified prediction block may be derived. A modified prediction sample of the modified prediction block may be derived based on the above Equation 8.

The decoder derives a reconstructed block of the current block based on the modified prediction block in S950. The decoder may use the modified prediction block as the reconstructed block. In addition, the decoder may acquire residual information about the current block through the bitstream. If the residual information is acquired, the reconstructed block may be derived based on the modified prediction block and the residual information. The decoder may generate a reconstructed picture based on the reconstructed block. The reconstructed block may be stored and may be used later for intra prediction and/or inter prediction.

According to the above description of the present invention, information on prediction of a neighboring block of the current block may be used to predict the current block and, as a result, a complicated video may be reconstructed more efficiently.

In addition, according to the present invention, the current block may be predicted in consideration of correlation between a prediction sample and a reconstructed sample of a neighboring block and, as a result, a complicated video may be reconstructed more efficiently.

In addition, prediction performance may be enhanced by predicting the current block in consideration of correlation between a prediction sample and a reconstructed sample of a neighboring sample and, as a result, an amount of data of residual information may be reduced, thereby improving overall coding efficiency.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The above-described method according to the present invention may be implemented in a software form. The encoder and/or decoder according to the present invention may be included in a device that performs image processing in, a for example, TV, a computer, a smart phone, a set-top box, a display device, and the like.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. A video decoding method performed by a video decoder, the method comprising:

deriving a prediction mode of a current block;

generating a prediction block of the current block based on the prediction mode of the current block;

deriving a spatial neighboring block of the current block;

deriving correlation information based on a reconstructed block of the spatial neighboring block and a prediction block of the spatial neighboring block;

deriving a modified prediction block of the current block based on the prediction block of the current block and the correlation information; and deriving a reconstructed block of the current block based on the modified prediction block, wherein the correlation information comprises a weight per block unit and an offset per block unit, wherein the weight per block unit and the offset per block unit are derived through Least Square Method (LSM) with respect to values of reconstructed samples included in the reconstructed block of the spatial neighboring block and values of prediction samples included in the prediction block of the spatial neighboring block, wherein the modified prediction block is derived based on an equation as below:

$$P'(x,y) = \alpha P(x,y) + \beta$$

where $P'(x,y)$ denotes a modified prediction sample value at coordinates $(x,y)$ included in the modified prediction block, $P(x,y)$ denotes a prediction sample value at coordinates $(x,y)$ included in the prediction block of the current block, $\alpha$ denotes the weight per block unit based on the LSM, and $\beta$ denotes the offset per block unit based on the LSM, wherein, when the prediction block of the current block comprises I number of samples, the $\alpha$ denoting the weight per block unit is derived based on an equation as below:

$$\alpha = \frac{I \cdot \sum_{i=1}^{I} Rec_A(i) \cdot Pred_A(i) - \sum_{i=1}^{I} Rec_A(i) \cdot \sum_{i=1}^{I} Pred_A(i)}{I \cdot \sum_{i=1}^{I} Pred_A(i) \cdot Pred_A(i) - \left(\sum_{i=1}^{I} Pred_A(i)\right)^2}$$

where RecA(i) denotes an ith reconstructed sample value of the reconstructed block of the spatial neighboring block, and PredA(i) denotes an ith prediction sample value of the prediction block of the spatial neighboring block, and wherein the β denoting the offset per block unit is derived based on an equation as below:

$$\beta = \frac{\sum_{i=1}^{I} Rec_A(i) - \alpha \cdot \sum_{i=1}^{I} Pred_A(i)}{I}.$$

2. The video decoding method of claim 1, wherein the spatial neighboring block is a spatial neighboring block having a smallest difference value between samples, according to a phase, relative to the current block among spatial neighboring blocks of the current block.

3. The method of claim 1, wherein, when the prediction mode of the current block is an intra prediction mode, the modified prediction block of the current block is derived.

4. The video decoding method of claim 1, wherein:

the correlation information comprises a weight per sample unit and an offset per sample unit; and the weight per sample unit and the offset per sample unit are derived through Least Square Method (LSM) with respect to values of reconstructed samples in a first region of the reconstructed block of the spatial neighboring block, the first region located to correspond to a prediction sample of the prediction block of the current block, and values of prediction samples in a second region of the prediction block of the spatial neighboring block, the second region corresponding to the first region.

5. The video decoding method of claim 4, wherein the first region of the reconstructed block of the spatial neighboring block and the second region of the prediction block of the spatial neighboring block have an identical size.

6. The video decoding method of claim 1, wherein:

the correlation information comprises information on a difference value that corresponds to each prediction sample included in the prediction block of the current block; and the difference value indicates a difference value between a reconstructed sample value of the reconstructed block of the spatial neighboring block, which corresponds to a prediction sample of the prediction block of the current block, and a prediction sample value of the prediction block of the spatial neighboring block, which corresponds to a prediction sample to the prediction block of the current block.

7. The video decoding method of claim 6, wherein:

the difference value corresponding to each prediction sample included in the prediction block of the current block is derived based on an equation as below:

$$\Delta_1 = Rec_A(0, 0) - Pred_A(0, 0)$$
$$\Delta_2 = Rec_A(0, 1) - Pred_A(0, 1)$$
$$\vdots$$
$$\Delta_N = Rec_A(\sqrt{N}, \sqrt{N}) - Pred_A(\sqrt{N}, \sqrt{N})$$

where RecA(x,y) denotes a reconstructed sample value at coordinates (x,y) of the reconstructed block of the spatial neighboring block, PredA(x,y) denotes a prediction sample value at coordinates (x,y) of the prediction block of the spatial neighboring block, ΔN denotes a Nth difference value, and a final prediction block comprises N number of samples.

8. A video encoding method performed by a video encoder, the method comprising:

deriving a prediction mode of the current block;

generating a prediction block of the current block based on the prediction mode of the current block;

determining a spatial neighboring block of the current block;

generating correlation information based on a reconstructed block of the spatial neighboring block and a prediction block of the spatial neighboring block;

deriving a modified prediction block of the current block based on the prediction block of the current block and the correlation information;

generating residual information based on an original block of the current block and the modified prediction block; and encoding information on the prediction mode of the current block and the residual information, and outputting the encoded information, wherein the correlation information comprises a weight per block unit and an offset per block unit, wherein the weight per block unit and the offset per block unit are derived through Least Square Method (LSM) with respect to values of reconstructed samples included in the reconstructed block of the spatial neighboring block and values of prediction samples included in the prediction block of the spatial neighboring block, wherein the modified prediction block is derived based on an equation as below:

$$P'(x,y) = \alpha P(x,y) + \beta$$

where P'(x,y) denotes a modified prediction sample value at coordinates (x,y) included in the modified prediction block, P(x,y) denotes a prediction sample value at coordinates (x,y) included in the prediction block of the current block, α denotes the weight per block unit based on the LSM, and β denotes the offset per block unit based on the LSM, wherein, when the prediction block of the current block comprises I number of samples, the α denoting the weight per block unit is derived based on an equation as below:

$$\alpha = \frac{I \cdot \sum_{i=1}^{I} Rec_A(i) \cdot Pred_A(i) - \sum_{i=1}^{I} Rec_A(i) \cdot \sum_{i=1}^{I} Pred_A(i)}{I \cdot \sum_{i=1}^{I} Pred_A(i) \cdot Pred_A(i) - \left(\sum_{i=1}^{I} Pred_A(i)\right)^2}$$

where RecA(i) denotes an ith reconstructed sample value of the reconstructed block of the spatial neighboring block, and PredA(i) denotes an ith prediction sample value of the prediction block of the spatial neighboring block, and wherein the β denoting the offset per block unit is derived based on an equation as below:

$$\beta = \frac{\sum_{i=1}^{I} Rec_A(i) - \alpha \cdot \sum_{i=1}^{I} Pred_A(i)}{I}.$$

9. The video encoding method of claim 8, wherein the spatial neighboring block is determined to be a spatial neighboring block that has a smallest difference value between samples, according to a phase, relative to the current block among spatial neighboring blocks of the current block.

* * * * *